Dec. 13, 1966  C. N. KLAHR  3,292,044
DUSTWALL SHIELDING
Filed March 15, 1963  2 Sheets-Sheet 1

INVENTOR
Carl N. Klahr
BY Clive H. Bramson
ATTORNEY

Dec. 13, 1966 C. N. KLAHR 3,292,044
DUSTWALL SHIELDING
Filed March 15, 1963 2 Sheets-Sheet 2

INVENTOR
Carl N. Klahr

BY Clive H. Bramson
ATTORNEY

United States Patent Office 3,292,044
Patented Dec. 13, 1966

3,292,044
DUSTWALL SHIELDING
Carl N. Klahr, Brooklyn, N.Y.
(678 Cedar Lawn Ave., Lawrence, N.Y. 11559)
Filed Mar. 15, 1963, Ser. No. 265,431
8 Claims. (Cl. 317—3)

This invention relates generally to the defense of objects against hypervelocity pellets and more particularly to the protection of objects thereagainst by enveloping said objects with particles of dust, said particles being provided adjacently of the surface thereof although not contiguously therewith.

The integrity of aerospace vehicles, e.g., is continually endangered by hypervelocity pellets, meteoroids or any of the many small solid bodies traveling through outer space. Protection of the surfaces of such vehicles by armor plating or cladding generally comprises the means heretofore contemplated as protection against penetration by such pellets or meteoroids. Armor plating, however, in order to be effective in stopping a one gram pellet, e.g., having a relative velocity of 4.5 kilometers per second, must be hundreds of mils thick and correspondingly heavy, thus impeding the intended purpose of the vehicle.

Dustwall shielding as disclosed and described herein is similarly effective in protecting objects within the earth's atmosphere against pellet or bullet penetration where the pellet or bullet is characterized by relative velocities, with respect to the shielded object, of hypervelocity magnitude.

Accordingly, then, it will be appreciated that although structure for practicing the invention is primarily discussed herein as relating to space vehicles, the employment of dustwall systems to earth applications is similarly regarded as within the contemplation of this invention, a preferred embodiment of such employment being disclosed hereinbelow—following.

Essentially, therefore, the present invention is directed to employing a dustwall comprised of substantial numbers of minute dust particles suspended within close proximity of, e.g., a space vehicle surface to be protected, and extending outwardly thereof, a distance of e.g., one meter. The dust particles referred to herein are preferably of masses between $10^{-8}$ and $10^{-12}$ grams for some meteoroid protection applications, other applications, however, requiring larger or smaller particles. Said particles may be of uranium or osmium or of any other suitable material according to the ends sought, i.e., to maximize the optical transparency of a given mass per unit area. Thus, osmium and uranium are preferred because of their relatively high densities, although in principle any material which can be fabricated in the form of relatively uniform dust particles is suitable.

Another object of the instant invention resides in the provision of methods of containing dust particles adjacent space vehicle walls while precluding the settling of the particles upon said walls and while further precluding the escape of the particles from the dustwall area.

Another object of the invention is to utilize the concepts, structures and methods set forth hereinbelow for the protection of objects within the earth's atmosphere against hypervelocity pellets.

Still another object of the present invention is to provide a dustwall of the foregoing character whereby the number of dust particles per unit area are sufficiently small to thus permit clear visibility through the dustwall.

Other objects and advantages of the invention will be set forth in part hereinafter and in part will be obvious herefrom, or may be learned by practice of the invention, the same being realised and attained by means of the instrumentalities, constructions, arrangements, combinations, and improvements herein shown and described.

The accompanying drawings referred to herein and constituting a part hereof, illustrate several embodiments of the invention, and together with the description, serve to explain the principles of the invention.

It will be understood that the foregoing general objectives and the following detailed description as well are exemplary and explanatory but are not restrictive of the invention.

Figure 1:
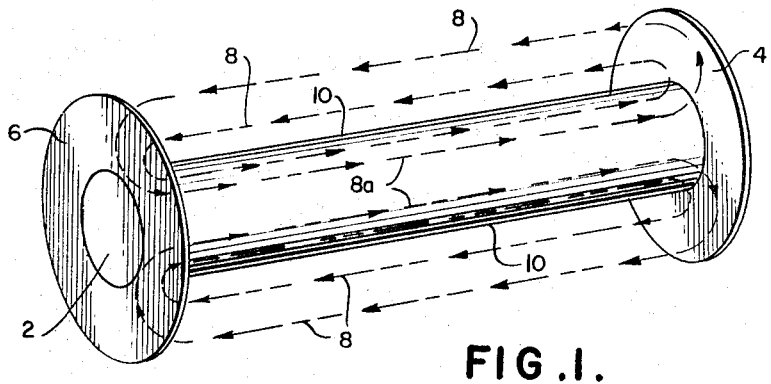
FIGURE 1 is a perspective view of the static wall version for dustwall containment, an emitting device and a catching device being provided in spaced relation concentrically of a portion of a space vehicle surface.

With reference to FIGURE 1 of the drawings, it will be observed that a portion of a space vehicle designated as numeral 2 therein, is provided with an emitting member 4 and a catching member 6, said members being arranged in spaced relation and concentrically and normally with respect to said portion 2, the space between said members being occupied by uncharged dust particles 8 moving at low velocities parallel to the surface of said space vehicle portion, said particles being emitted at the emitting member, collected at the catching member and transported within the vehicle (note particles designated 8a) for return to the emitting member for recirculation. Thus slowly moving streams of particles moving in one direction are constantly maintained adjacently of surface 10 of the space vehicle portion to form a dustwall thereabout. Typical mechanisms for accomplishing the emitting result include mechanical impellers and ion gun means, the former being capable of directing the dust toward the catching member and the latter being capable of emitting electrostatically charged dust particles. Typical mechanisms for accomplishing the catching function include funnel or U-shaped structures which direct the incoming particles into the receiving section wherefrom they are recirculated.

Figure 2:
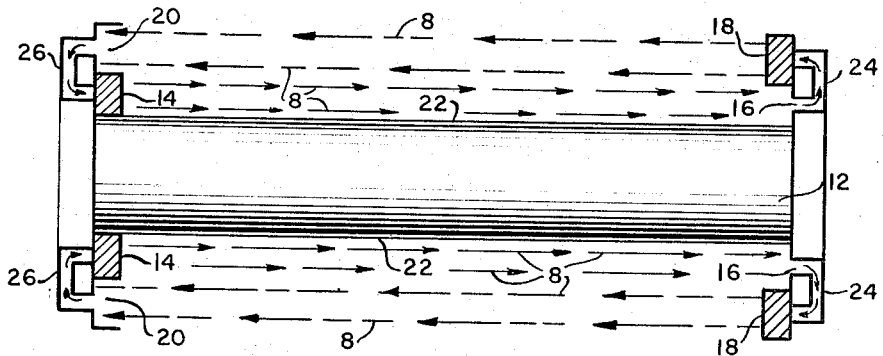
FIGURE 2 is a cross sectional elevation view of an alternate embodiment of the static wall shown in FIGURE 1.

FIGURE 2 discloses an alternate embodiment of the structure above-described with reference to FIGURE 1. As will be observed in said FIGURE 2, herein shown in cross-section is a portion of a space vehicle 12 having pairs of spaced emitting and catching members 14, 16 and 18, 20, respectively, disposed annularly with respect to said space vehicle portion, said respective pairs of members are arranged concentrically with respect to one another. Although shown in cross-section, it will be understood that said combined emitting and catching members 14, 20 and 16, 18, each form integral structures disposed concentrically about vehicle surface 22 in the same manner as members 4 and 6 are arranged about surface 10 as shown in aforedescribed FIGURE 1. Thus, in accordance with the structure as illustrated in FIGURE 2, dust particles emitted from emitting member 14, move toward catching member 16, are collected thereby and are educted through conduit 24 to emitter member 18. Particles emitted by member 14 and collected in emitter 18 are ejected therefrom in the direction of catching member 20, wherefrom said particles are educted through conduit 26 and returned to emitting member 14. Ejection of said particles from said emitting member 14 is effectuated as said particles are recirculated thereto. Accordingly, through employment of this embodiment, recirculation of said particles within the space vehicle portion is avoided.

Figure 3:
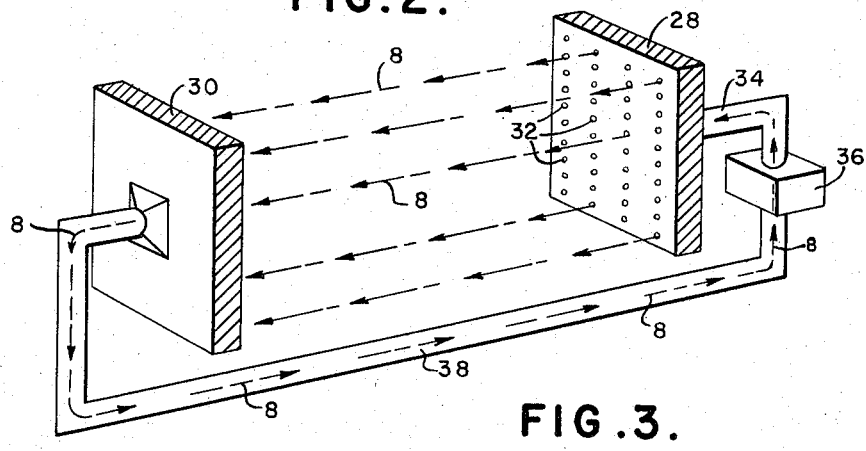
FIGURE 3 is an isolated enlarged portion of the emitting and catching members employed in the embodiments illustrated in FIGURES 2 and 3.

A more detailed disclosure of the emitting and catching member configuration is provided in FIGURE 3 of the drawings wherein is shown a perspective illustration of a fragmentary section of the emitting and catching members utilized in the structures according to FIGURES 1 and 2 hereinabove described. In FIGURE 3, emitting and catching member sections 28 and 30, respectively, are shown disposed in spaced relation, particles of duct 8 being suspended therebetween in slow parallel movement. Said emitting member 28 is provided with orifices 32, said orifices being arranged to form a microperforated "shower head," through which dust particles, or particle-forming-fluids are ejected into the space lying between said members 28 and 30. Said particles or particle-forming-fluids are fed into passage 34, which is communicably related with orifices 32, from dust or fluid reservoir 36, gas, hydraulic or mechanical pressure, or electrostatic acceleration or other suitable means being employed to direct said particles to emitting member 28 for ejection therefrom through orifices 32, the ejection velocities ranging, e.g., between 1 and $10^{-1}$ centimeters per second. Said particles move slowly with respect to the vehicle but are not stationary with respect to the vehicle. Where, e.g., mercury is used as the particle-forming-fluid, it can be pumped under pressure into passage 34 and thence through emitter 28 where it is broken into droplets and emitted from the holes 32. The recirculation pattern disclosed in FIGURE 3 is consistent with the embodiment shown in FIGURE 1, i.e., recirculation of the dust particles being internally of the space vehicle portion through conduit 38 provided therefor, wherethrough said particles are recirculated to said passage 34 for re-emission from said emitting member 28.

Figure 4:
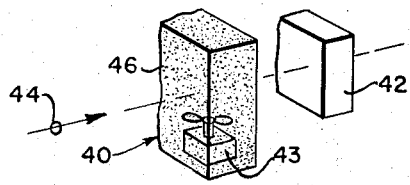
FIGURE 4 is a perspective view of a dustwall shield application within the earth's atmosphere.

As seen in FIGURE 4 of the drawings, the principle of dustwall shielding as disclosed herein is shown employed for the protection of earth situated objects against hypervelocity pellets or bullets. As illustrated in said FIGURE 4, dustwall 40, which constitutes a gas suspension of particles, is interposed between object 42 and hypervelocity pellet or bullet 44 moving toward said object. It will be appreciated that said dustwall is contained within container 46, said container being formed of aluminum, plastic or any other material suitable for containing the dustwall in position to accomplish shielding of the object 42. Agitator 43 is provided as shown, to maintain suspension of the dust particles; the density of the dustwall, the dust particle material and the thickness of the dustwall itself being determinable in accordance with the disclosure hereinbelow. Similarly in accordance with the following disclosure, it will be appreciated that the hypervelocity pellet or bullet 44, will vaporize upon colliding with the dustwall 40 comprised of dust particles 8, prior to reaching the object 42. It will be further appreciated that penetration by pellet 44 into container 46, will destroy the dustwall containment structure, replacement thereof being required to establish further protection.

Figure 5:
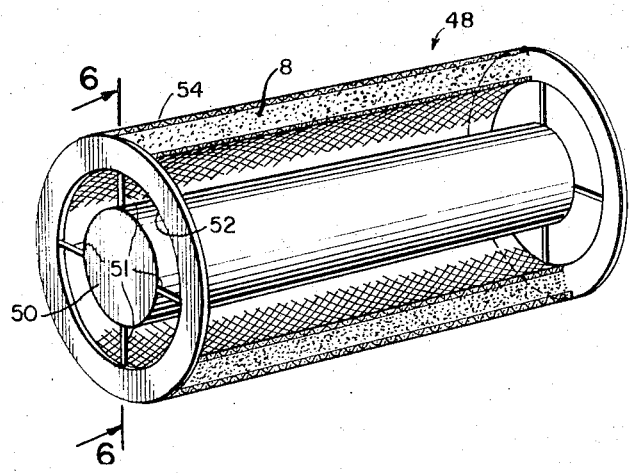
FIGURE 5 is a perspective view of the dust gas version for dustwall containment, a surrounding reflecting grid of insulated conducting wires charged with the opposite sign of potential as the dust particles contained therein being provided concentrically and parallel with respect to a portion of the space vehicle surface.
Figure 6:
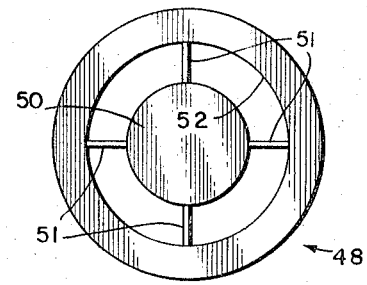
FIGURE 6 is an end view of the structure according to FIGURE 5 taken along line 6—6 of FIGURE 5.

Another embodiment of the instant invention as applied to aerospace vehicle shielding is illustrated in FIGURES 5 and 6 of the drawings. This embodiment requires the containment of charged dust particles 8 within a reflecting grid 48 composed of insulated conducting wires or other wide mesh conducting material covered with insulation, said grid being disposed in spaced, concentric and longitudinal relation with respect to space vehicle or portion thereof 50, spacing arms 51 being provided to support the grid thereabout. Insulated covering on the grid is instrumental in preventing charge neutralization between opposite charges on grid and dust particles in the event of dust particle collisions with the grid. Said reflecting grid is of wide mesh material and thus optically transparent and charged with the opposite sign of potential as the dust particles. It will be appreciated that the electrostatically charged particles move in random fashion within the containment area defined by inner gridwork walls 52 and outer gridwork wall 54, FIGURE 6 being an end view of FIGURE 5 illustrating the relational arrangement of said containment area and said space vehicle portion 50. Inasmuch as the internal pressure upon the dust gas consists of the sum of the ordinary kinetic pressure and the electrical pressure due to mutual repulsion of the dust particles, the internal pressure upon the dust gas must be balanced by electrostatic attraction by the grid, grid voltages, e.g., in the range of 50,000 to 100,000 volts being suitable. It will be appreciated that electrostatic grid containment of the charged dust gas may be enhanced by use of a second grid 54 with the same sign of potential as the charged dust particles, which would be placed parallel to said first grid outside the area of dustwall containment. Thus the electrostatic repulsive force of the second grid is added to the electrostatic attractive force of said first grid in containing the charged dust particles. The particles do not accumulate on the grid despite the electrostatic attraction of the grid for the particles because of the initial kinetic energy of the particles whose conservation does not permit the particles to come to rest.

The mass of typical dustwall particles utilizable range in the order of $10^{-6}$ to $10^{-12}$ grams although larger mass particles may be used against large hypervelocity pellets. Regardless of which of the foregoing dustwall containment embodiments is employed, the dustwall particles thereof move very slowly compared to the velocity of an impinging hypervelocity pellet. Nevertheless, their relative velocity with respect to the hypervelocity pellet is equal to the velocity of the pellet with respect to the space vehicle. A collision between such a small dust particle and a hypervelocity pellet is substantially inelastic. Therefore, the relative kinetic energy of the dust particles with respect to the pellet is substantially converted into heat.

A hypervelocity pellet will heat up and vaporize within a short distance of its traversal through a sufficiently thick dustwall, e.g., one or more meters thick. Thus, the kinetic energy of the pellet will be used to vaporize the pellet. Inasmuch as most of the kinetic energy of a dust particle with respect to a pellet is converted into heat to vaporize the pellet, the dustwall is substantially more effective in stopping the pellet than is an equivalent mass of armor plating.

The following calculations have been made concerning the protection of space vehicles against hypervelocity pellets with dustwalls according to the present invention:

(1) A sufficiently thick dustwall can vaporize any hypervelocity pellet with a relative velocity greater than 4 to 5 kilometers per second. At this velocity the particle kinetic energy is equal to the thermal energy required to vaporize it, independent of the particle mass.

(2) The required dustwall density for vaporizing a pellet with a surface density of 1 gram per square centimeter of cross-sectional area is approximately 100 to 200 grams of dust per square meter of surface to be protected. For typical meteoroid densities, 10 grams of dust per square meter is sufficient. An incident meteoroid of one milligram mass will suffer about 22,000 collisions with dust particles in such a dustwall, causing it to vaporize and disperse.

(3) A pellet with a surface density of 10 grams per square centimeter of cross-sectional area requires approximately a kilogram of dust per square meter of area.

These foregoing relations as stated in (2) and (3) above assume a relative velocity of 30 kilometers per second. In comparison, the mass of ordinary armor plate required to prevent penetration at these velocities of the 10 gram per square centimeter pellet is of the order of a ton per square meter.

It will be appreciated that dustwall systems within the purview of this invention are light in weight and are reliable in view of their simplicity. They can be turned on and off and in the event the dustwall is lost, it can be restored. The estimated mass of a dustwall protection system for a space vehicle with 100 square meters of exposed area against meteoroids will be considerably less than 5 pounds with respect to the dustwall per se, plus the mass of associated equipment.

*Inelastic energy transfers*

The fraction of the relative kinetic energy of the dust particle which is converted into heat upon collision with a meteoroid will depend on the relative masses, the relative size and the material properties of the two bodies. Two extreme types of collisions considered herein are (1) thick target collisions in which the target thickness is considerably greater than the penetration distance; and (2) thin target collisions in which the target thickness is much less than the distance the pellet could penetrate into a thick target. In a thick target collision the entire relative kinetic energy of the smaller particle is converted into heat. In a thin target collision very little of the relative kinetic energy is converted into heat. The basic principle of a dustwall is that a pellet incident on a dustwall experience a large number of thick target collisions since each dust particle views the pellet as a thick target, e.g., a $10^{-9}$ gram dust particle incident on a meteoroid will penetrate approximately 5 mils as compared with the 80 mil diameter of the meteoroid. Hence, this is a thick target collision and the relative kinetic energy is completely converted into heat. In the case of larger dust particles and smaller meteoroid collisions, the particle may completely penetrate the meteoroid leaving a fraction of its relative kinetic energy as heat. This inelastic transfer is significant since it will determine the number of collisions necessary to vaporize the meteoroid. Only a negligible fraction of the kinetic energy is converted into heat in thin target collisions. However, for large dust particles impinging on smaller meteoroids, the energy deposition will depend on the distance traversed through the target. That is:

$$E = A \frac{dw}{ds} S$$

where $E$=energy of the impinging particle converted into heat.
$A$=area of the impinging particle.
$dw/ds$=work done in deformation per unit area of contact per unit distance of penetration. This is a mean value that will depend upon the penetration distance.
$S$=penetration distance.

When the target is very thin, the work done in deformation is only against the yield stress in the material. Thus $dw/ds$=2 joules per square centimeter of area per mil of penetration.

For a thick target:

$dw/ds$=280 joules per square centimeter of area per mil of penetration.
For targets of intermediate thickness the above values would apply proportionately as long as the impinging particle does not penetrate the opposite surface without substantial loss of kinetic energy. Actually, the work done in deformation, even for a thin target, is against complex viscous hydrodynamic forces. Therefore, $dw/ds$ would be between the two extreme values aforegiven.

Accordingly, the fraction of the kinetic enregy converted into heat when a dust particle of given mass strikes a meteoroid of given mass can be calculated, the values given below being the percentage of kinetic energy converted into heat:

| Dust Particle Mass in grams | Meteoroid Mass in grams | | | |
|---|---|---|---|---|
| | $10^{-3}$ | $10^{-4}$ | $10^{-5}$ | $10^{-6}$ |
| $10^{-10}$ | 100% | 100% | 100% | 61% |
| $10^{-9}$ | 100% | 100% | 75% | 33% |
| $10^{-8}$ | 96% | 50% | 23% | 10% |

It can thus be concluded that the dustwall will destroy small meteoroids as effectively as it will destroy larger ones. Although a smaller fraction of the kinetic energy is converted into heat, compensation is made by the lesser energy requirement for vaporization of the small meteoroid.

It will be further appreciated that only a very small fraction of the kinetic energy of the meteoroid is required for vaporization thereof by the dustwall. The kinetic energy of a meteoroid in joules is tabulated as follows:

| Meteorid Mass in grams | Kinetic Energy in joules | | Energy required for Vaporization in joules |
|---|---|---|---|
| | V=30 kn/sec. | V=10 kn/sec. | |
| $10^{-3}$ | 450 | 50 | 10 |
| $10^{-4}$ | 45 | 5 | 1.0 |
| $10^{-5}$ | 4.5 | 0.5 | 0.1 |
| $10^{-6}$ | 0.45 | 0.05 | 0.01 |

It is seen that the heat required for vaporization is substantially less than the available kinetic energy.

It is significant that for a sufficiently thick dustwall a meteoroid will be vaporized regardless of its mass, as long as it has a sufficiently high speed, since its kinetic energy and the energy required for vaporization thereof are each proportional to the mass. The critical speed below which a meteoroid cannot be vaporized by a dustwall lies between 4 to 5 kilometers per second.

*Dustwall opacity to optical radiation*

The required dustwall density for protection against meteoroids of 1 milligram mass and less has been calculated to be 2 to 10 grams per square meter, depending upon the meteoroid density. The relation between dustwall opacity and optical radiation are as follows:

Particle mass in grams: Percentage of optical area obscured
$10^{-8}$ _____ 3
$10^{-9}$ _____ 6.6
$10^{-10}$ _____ 14.2

A meteoroid density of .1 gram per square centimeter is assumed. However, the opacity to longer wave radiation is considerably less, in accordance with the Rayleigh scattering law for metallic spheres:

$$\frac{\text{scattering cross section}}{\text{geometric cross section}} = 9\left(\frac{2\pi r}{\lambda}\right)^4 \text{ for } \frac{r}{\lambda} < \frac{1}{6}$$

where $\lambda$ is the wavelength of the radiation and $r$ is the dust particle radius. For a $10^{-9}$ gram dust particle, the scattering cross section is less than the geometric cross section, at infra-red radiation longer than 27 microns. Thus for millimeter or centimeter microwave radiation the opacity is effectively zero. Therefore, for infra-red and microwave radiation the dustwall density can be considerably higher without sacrificing a clear line of sight. For certain ranges in the infra-red, i.e., between 2.3 and 12 microns, the opacity may be up to 3.5 times greater than what is estimated from the geometric cross section alone.

The practical result of these considerations is that the allowable dustwall density can be considerably greater, or the dust particle size can be considerably less than the nominal values, based on 2 to 10 grams per square meter and $10^{-9}$ gram particles, depending upon the wavelength to be transmitted. Thus, for microwave radiation of 1 centimeter wavelength, $10^{-12}$ gram particles can be used without appreciable opacity, while for optical radiation the particles would obscure over ⅓ of the radiation. This conclusion is of import since the smaller particles are more effective with respect to inelastic energy transfer.

Although various embodiments of dustwall shielding structures and methods have been described herein, it will be understood that within the purview of this invention various changes may be made in the forms, details, proportion and arrangement of parts, it being intended not to be precluded with respect to other feasible containment methods as, e.g., containment of dust particles in gas suspension within a thin walled vessel, the walls of which may be transparent; suspension by mechanical vibrations against an electric or magnetic field, or against a gravitational field; electromagnetic oscillation of magnetizable particles; magnetostatic containment of magnetic particles; containment in suspension within a gas or plasma; and containment against a gas current or against a current due to directed evaporation from heated surfaces.

What is claimed is:

1. A method of shielding the surface of an object against collision with hypervelocity pellets comprised of containing a wall of discrete and disassociated dust particles adjacent the surface of the object, said dust particles being each sufficiently small, relative to the size of a hypervelocity pellet to make the impact between a particle and said pellet a thick target collision, and wherein the total number of dust particles per unit area of protected surface is sufficient to disintegrate the pellet by the total of the individual hypervelocity interaction effects of the dust particle collisions against the pellet.

2. A method of shielding the surface of an object against collision with hypervelocity pellets comprised of providing a wall of discrete and disassociated dust particles in front of the surface of the object, said dust particles being each less than $\frac{1}{1000}$ the mass of a pellet, wherein the total number of said dust particles per unit area of protected surface is no greater than 2000 grams per square meter.

3. A method of shielding the surface of an object against collision with hypervelocity pellets comprised of providing a wall of discrete and disassociated dust particles adjacent to the surface of the object, said dust particles being each sufficiently small relative to the size and mass of a hypervelocity pellet to make the impact between a particle and said pellet a thick target collision, and wherein the total number of said dust particles per unit area of protected surface is sufficient to disintegrate the pellet by the total of the individual hypervelocity interaction effects of the dust particle collisions against the pellet, the dust particle size, dust particle density, number of dust particles per unit volume, and per unit surface area being selected to give a desired optical transparency or opacity, or transparency or opacity to other electromagnetic radiation incident upon the wall.

4. A method for shielding the surface of an object against collision with hypervelocity pellets, comprising containing a wall of suspendable discrete and disassociated dust particles adjacent to the surface of the object, said dust particles being each sufficiently small in relation to the size and mass of a hypervelocity pellet to make the impact between a particle and said pellet a thick target collision, and wherein the total number of said dust particles per unit area of protected surface is sufficient to disintegrate the pellet by the total of the individual hypervelocity interaction effects of the dust particle collisions against the pellet, and circulating said contained dust particles to maintain a suspension thereof.

5. A method for shielding the surface of an object against collision with hypervelocity pellets comprising providing a wall of discrete and disassociated dust particles adjacent to the surface of the object, said particles being each sufficiently small in relation to the size and mass of a pellet to make the impact between a particle and said pellet a thick target collision, and wherein the total number of said particles per unit area of protected surface is sufficient to disintegrate the pellet by the total of the individual hypervelocity interaction effects of the particle collisions against the pellet, and containing said particles between space inner and outer grids of insulated conducting wires, charging each said particle electrostatically with the same sign of charge, charging said inner grid with the opposite sign of potential as the dust particles, and charging said outer grid with the same sign of potential as said dust particles.

6. A method for shielding the surface of an object against collision with hypervelocity pellets comprising providing a wall of discrete and disassociated dust particles adjacent the surface of the object, said particles being each sufficiently small in relation to the size and mass of a pellet to make the impact between a particle and said pellet a thick target collision, and wherein the total number of said particles per unit area of protected surface is sufficient to disintegrate the pellet by the total of the individual hypervelocity interaction effects of the particle collisions against the pellet, suspending said particles within a gas, containing said gas suspension within a thin-walled enclosure, and circulating the gas suspension to prevent settling of the particles.

7. A method for shielding the surface of an object against collision with hypervelocity pellets comprising providing a wall of discrete and disassociated dust particles adjacent the surface of the object, said particles being each sufficiently small in relation to the size and mass of a pellet to make the impact between a particle and said pellet a thick target collision, and wherein the total number of said particles per unit area of protected surface is sufficient to disintengrate the pellet by the total of the individual hypervelocity interaction effects of the particle collisions against the pellet, charging each said particle electrostatically with the same sign of charge, and containing said wall of charged particles by providing a grid of insulated conducting wires within said wall, and charging said grid with the opposite sign of potential as said dust particles.

8. A method for shielding the surface of an object against collision with hypervelocity pellets comprising providing a wall of discrete and disassociated dust particles adjacent the surface of the object, said particles being each sufficiently small in relation to the size and mass of a pellet to make the impact between a particle and said pellet a thick target collision, and wherein the total number of said particles per unit area of protected surface is sufficient to disintegrate the pellet by the total of the individual hypervelocity interaction effects of the particle collisions against the pellet, and circulating said particles between at least one particle-emitting and at least one particle-catching member to thereby sustain said wall.

References Cited by the Examiner

UNITED STATES PATENTS

| | | | |
|---|---|---|---|
| 1,969,379 | 8/1934 | Meissner | 317—3 X |
| 2,114,682 | 4/1938 | Gumaer | 317—3 X |
| 2,640,158 | 5/1953 | Hicks | 317—4 X |
| 2,763,125 | 9/1956 | Kadosch et al. | 313—80 X |
| 2,820,946 | 1/1958 | Robinson | 313—7 X |

OTHER REFERENCES

Rodriguez, Meteoroid Shielding for Space Vehicles, Aero/Space Engineering, December 1960, pp. 20–33, 55–66.

MILTON O. HIRSHFIELD, *Primary Examiner.*

SAMUEL BERNSTEIN, STEPHEN W. CAPELLI,
*Examiners.*

J. A. SILVERMAN, *Assistant Examiner.*